United States Patent [19]
Gagnon

[11] 3,780,346
[45] Dec. 18, 1973

[54] DIGITAL ANTI-SPIN AND ANTI-SLIDE SYSTEM FOR MOVING VEHICLES

[75] Inventor: Robert G. Gagnon, Ellington, Conn.

[73] Assignee: United Aircraft Corporation, East Hartford, Conn.

[22] Filed: July 3, 1972

[21] Appl. No.: 268,231

[52] U.S. Cl. .................................................. 317/5
[51] Int. Cl. ............................................. G01p 3/42
[58] Field of Search .......................................... 317/5

[56] References Cited
UNITED STATES PATENTS
3,649,871  2/1970  Klein ...................................... 317/5

Primary Examiner—L. T. Hix
Attorney—Donald F. Bradley

[57] ABSTRACT

A magnetic pickup located in close proximity to a gear mounted on a vehicle wheel or axle produces a series of pulses indicative of wheel velocity. A binary up/down counter is set to a preselected binary count, and the wheel velocity pulses are alternatively directed to the up and down inputs of the counter for equivalent intervals of time. Any count remaining in the counter after the up and down counts which differs from the preselected count indicates acceleration or deceleration of the wheel, and the appearance of a binary one in any one of several preselected bits in the counter at the end of a counting cycle cause the application or release of the wheel brakes.

6 Claims, 2 Drawing Figures

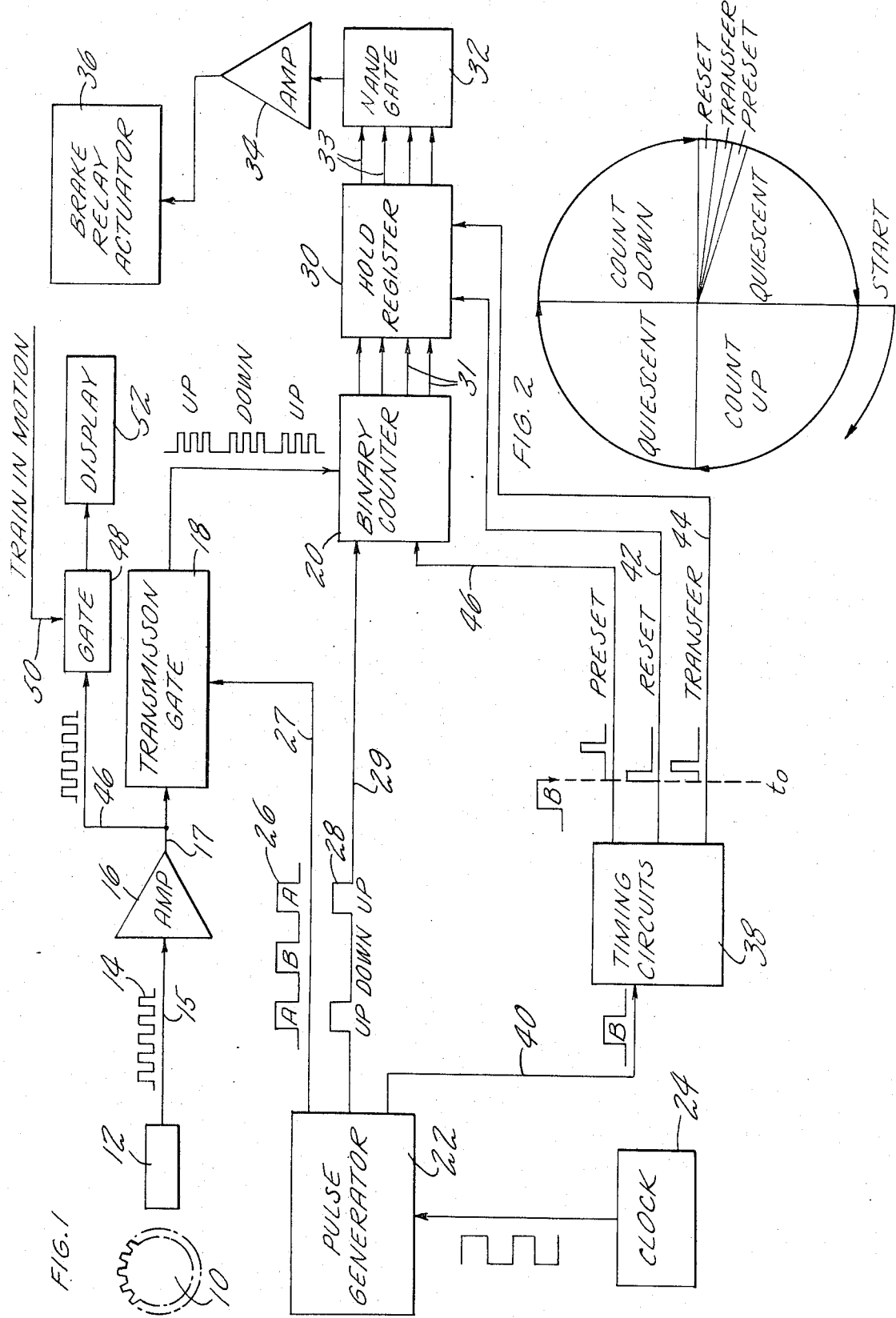

DIGITAL ANTI-SPIN AND ANTI-SLIDE SYSTEM FOR MOVING VEHICLES

BACKGROUND OF THE INVENTION

1. Field of the Invention

This invention relates to an apparatus and a method for determining whether the wheels of a moving vehicle such as a train are spinning or sliding. If a spin or slide condition is detected, and exceeds a predetermined magnitude, corrective action such as applying or releasing the brakes is instituted. A digital counter preset to a selected binary number is used to sense acceleration or deceleration, and determines when corrective action should be taken by the appearance of a binary one in any of a plurality of bits.

2. Description of the Prior Art

Many devices are known in the art for determining the occurrence of a spinning or sliding condition of the wheels of a vehicle. Spinning refers to the condition that exists when a wheel is rotating at a speed greater than the speed of the vehicle, while sliding refers to the condition that exists when a wheel is rotating at a speed less than the speed of the vehicle, that is, the wheel is skidding rather than rolling. Both conditions are undesirable because of the additional friction and heat which may cause wheel damage, and because either condition reduces the effective braking force.

The U.S. Pat. to Sheppard, No. 3,482,887, uses magnetic proximity pickups to monitor the velocity of the wheels of a train and to generate an AC voltage having a frequency proportional to velocity. The AC voltage is converted to DC and differentiated to produce an acceleration signal. Any wheel which is out of step with the other wheels indicates a malfunction, and brake control means may be actuated to correct the problem.

Other brake controls to prevent spinning or sliding or the wheels of a vehicle are known in the art. The U.S. Pat. to Ballard, No. 3,528,708, uses an analog system to sense the speed of one wheel of a vehicle and compare it with other wheel speeds to produce error signals which are applied to the pressure release valves in the hydraulic brake lines of the slower turning wheels to prevent sliding thereof. The U.S. Pat. to Richmond, No. 3,525,044, detects speed differences in the axle of a vehicle by means of a magnetic pickup coacting with a gear connected directly with the axle, and uses a digital speed system including an electric counter for generating a speed reading.

The U.S. Pat. to Carp et al., No. 3,499,689, is another analog anti-slide system for controlling the braking of a vehicle. A DC signal indicative of wheel acceleration is compared with a reference level to produce an error voltage, and a solenoid valve winding of a hydraulic pressure modulator is actuated in response thereto. The U.S. Pat. to Slavin et al., No. 3,494,671, produces a DC voltage signal proportional to wheel acceleration which is compared to a reference, and an error signal is generated for a hydraulic pressure modulator in the braking system.

The present invention is an improved system for providing wheel slide protection on trains or other vehicles during braking. The system avoids many of the deficiencies of the prior art by utilizing novel digital techniques which may be implemented by integrated circuitry, as opposed to the analog methods used in the past.

In general, in analog systems a sensor produces a series of pulses having a frequency proportional to wheel velocity, and the frequency signal is converted to a DC voltage level proportional to frequency (wheel velocity) by a pulse ratio integrator. The DC voltage is fed to a differentiator whose output voltage amplitude is proportional to the time rate of change of the DC input voltage to the differentiator, or, in other words, to the wheel acceleration. A trigger network is used to detect the voltage amplitude, and when this voltage exceeds a preset level, a signal is applied to relieve the braking force on the sliding wheel.

SUMMARY OF THE INVENTION

The present invention avoids the complexity of the prior art analog systems and utilizes a novel digital system in which the incoming frequency signal is used to initiate an up count in a binary counter for a fixed time interval. The next identical fixed time interval diverts the incoming frequency signal to initiate a down count. The residue count or the remainder left in the up/down counter is proportional to the time rate of change of the incoming signal or change in wheel speed (acceleration or deceleration). A trigger network is used to detect the residue count; when the count exceeds preset binary values, a signal is applied to relieve the braking force on the sliding or spinning wheel.

In accordance with an additional novel embodiment of the present invention, the up/down counter is preset to a binary number equivalent to decimal 1,032. By properly adjusting the time duration of the up and down counts in the counter, the binary counter will automatically recognize the occurrence of wheel spin or slide by the presence of a binary one in the fourth, fifth, sixth or seventh bits of the counter after the up and down counts have been processed, that is, in the residue or remainder count.

An additional novel feature of the present invention is a loss of signal detection circuit which indicates loss of the wheel frequency signal from the sensor or a malfunction of the system. When a signal loss or malfunction occurs, an indicator light may be displayed, and the braking system on the axle with the fault may be temporarily disconnected until corrective action is taken.

BRIEF DESCRIPTION OF THE DRAWINGS

FIG. 1 is a block diagram, partially in schematic form, of the anti-spin and anti-slide system of this invention; and FIG. 2 is a graphical representation of the timing cycle for the system of FIG. 1.

DESCRIPTION OF THE PREFERRED EMBODIMENT

The novel digital anti-spin and anti-slide system of this invention will be described as being applied to a train, although it will be apparent that the principles of the invention are equally applicable to other types of moving vehicles. It will also be apparent that once a spin or a slide of a wheel or axle is sensed, various types of corrective action including the application or release of the braking system may be performed. The present system is described in terms of releasing the brakes for the wheel or axle in which a spin or slide has been detected.

Referring particularly to FIG. 1, a gear 10 is fixably attached to the wheel or axle to be monitored. A magnetic pickup or sensor 12 is located in close proximity to the gear 10. By means of magnetic coupling, a pulse is generated by the magnetic sensor 12 each time a tooth on the gear 10 passes the sensor 12, and a train of pulses is produced which is proportional to the rotational velocity of the wheel or axle. The pulse frequency is also a function of the number of gear teeth in the gear 10. The construction and operation of this type of magnetic sensor is well known in the art, and need not be described in detail.

The magnetic sensor pulses shown at 14 are fed through line 15 to a buffer amplifier 16 where isolation is provided, and then from the output of the buffer amplifier through line 17 to a transmission gate 18. As will be described, the gate 18 feeds the train of pulses in proper sequence to the up and down inputs of a binary counter 20. The counter 20 will count the number of pulses occurring during a predetermined time interval, and then subtract from the original count the number of pulses occurring during the next identical time interval, the difference between the two counts being indicative of an acceleration or deceleration of the wheel or axle during the two time intervals.

In order to control the passage of pulses through transmission gate 18, and to properly set the binary counter 20 at the proper time intervals, gating pulses are generated in a pulse generator 22 in response to constant frequency input provided by a clock or oscillator 24 which, for example, may have a frequency of 4 Hz. The pulse generator 22 produces a series of timed pulses 26 in which alternate pulses are labeled A and B. The pulses 26 are fed to transmission gate 18 through line 27. The pulses produced by the gear and magnetic sensors 10 and 12, referred to hereinafter as data pulses, will pass through transmission gate 18 to the binary counter 20 only when the transmission gate 18 is gated on by either an A or a B pulse from pulse generator 22. For a clock rate of 4 Hz, each of the A and B pulses 26 has a time duration of 0.125 seconds. If the train is traveling at a constant speed of 50 mph for a representative gear 10, the magnetic wheel sensor 12 is delivering data pulses at the rate of 2,000 Hz, and approximately 250 pulses will pass through transmission gate 18 during the occurrence of an A or a B pulse.

Also produced in pulse generator 22 are a series of up/down pulses 28 which are fed to the up/down control input of binary counter 20 through line 29. The up pulses occur only during the occurrence of an A pulse 26, the remaining time being a down pulse. The binary counter 20 is thus gated by up/down pulses 28 so that the data pulses 14 which pass through transmission gate 18 during the time corresponding to an A pulse 26 will be counted up only by the counter 20 and those data pulses 14 which pass through transmission gate 18 during the occurrence of a B pulse 26 will be counted down only. If the wheel or axle is turning at a constant speed, the binary counter 20 will therefore count up by 250 during the time of the A pulses, and will count down by 250 during the time of the B pulses. The net pulses count will be zero with a pulse ambiguity of ±2 pulse counts. However, if the wheel or axle is accelerating or decelerating, the net pulse count will be other than zero. The accumulation or remainder in the counter 20 will then be transferred to a hold register or temporary storage 30 through line 31 by means of timing commands. The circuitry following the hold register 30 will recognize a count accumulation or remainder and will relieve the brake force on the sliding or spinning wheel-axle set if the spinning or sliding exceeds a predetermined magnitude.

By presetting the up/down binary counter 20 to the proper binary count, it is possible to detect wheel-axle acceleration or deceleration above the normal capability of the train. For example, if the up/down counter 28 is preset to the digital number 1032, or binary number 10 000 001 000, a binary one will appear in the fourth, fifth, sixth or seventh bit only when the wheel-axle acceleration or deceleration has exceeded a rate of approximately 6.5 mph/sec., and the brakes may automatically be de-energized as will subsequently be described.

Table I shows the binary and decimal number equivalents of the remainder in the counter 20 for the clock pulse rate and data pulse rate described previously.

TABLE 1

| Decimal number | Binary equivalent | | | | | | | | | | | | Remainder count | Speed change MPH/sec. |
|---|---|---|---|---|---|---|---|---|---|---|---|---|---|---|
| | $2^{11}$ | $2^{10}$ | $2^9$ | $2^8$ | $2^7$ | $2^6$ | $2^5$ | $2^4$ | $2^3$ | $2^2$ | $2^1$ | $2^0$ | | |
| 775 | 0 | 0 | 1 | 1 | 0 | 0 | 0 | 0 | 0 | 1 | 1 | 1 | | |
| 776 | 0 | 0 | 1 | 1 | 0 | 0 | 0 | 0 | 1 | 0 | 0 | 0 | −248 | +196.4 |
| ↓ | | | | | | | | | | | | | | |
| 1022 | 0 | 0 | 1 | 1 | 1 | 1 | 1 | 1 | 1 | 1 | 1 | 0 | −10 | |
| 1023 | 0 | 0 | 1 | 1 | 1 | 1 | 1 | 1 | 1 | 1 | 1 | 1 | −9 | +7.2 |
| 1024 | 0 | 1 | 0 | 0 | 0 | 0 | 0 | 0 | 0 | 0 | 0 | 0 | −8 | +6.4 |
| 1025 | 0 | 1 | 0 | 0 | 0 | 0 | 0 | 0 | 0 | 0 | 0 | 1 | −7 | +5.6 |
| 1026 | 0 | 1 | 0 | 0 | 0 | 0 | 0 | 0 | 0 | 0 | 1 | 0 | −6 | +4.8 |
| 1027 | 0 | 1 | 0 | 0 | 0 | 0 | 0 | 0 | 0 | 0 | 1 | 1 | −5 | +4.0 |
| 1028 | 0 | 1 | 0 | 0 | 0 | 0 | 0 | 0 | 0 | 1 | 0 | 0 | −4 | +3.2 |
| 1029 | 0 | 1 | 0 | 0 | 0 | 0 | 0 | 0 | 0 | 1 | 0 | 1 | −3 | +2.4 |
| 1030 | 0 | 1 | 0 | 0 | 0 | 0 | 0 | 0 | 0 | 1 | 1 | 0 | −2 | +1.6 |
| 1031 | 0 | 1 | 0 | 0 | 0 | 0 | 0 | 0 | 0 | 1 | 1 | 1 | −1 | +.8 |
| 1032 | 0 | 1 | 0 | 0 | 0 | 0 | 0 | 0 | 1 | 0 | 0 | 0 | 0 | 0 |
| 1033 | 0 | 1 | 0 | 0 | 0 | 0 | 0 | 0 | 1 | 0 | 0 | 1 | +1 | −.8 |
| 1034 | 0 | 1 | 0 | 0 | 0 | 0 | 0 | 0 | 1 | 0 | 1 | 0 | +2 | −1.6 |
| 1035 | 0 | 1 | 0 | 0 | 0 | 0 | 0 | 0 | 1 | 0 | 1 | 1 | +3 | −2.4 |
| 1036 | 0 | 1 | 0 | 0 | 0 | 0 | 0 | 0 | 1 | 1 | 0 | 0 | +4 | −3.2 |
| 1037 | 0 | 1 | 0 | 0 | 0 | 0 | 0 | 0 | 1 | 1 | 0 | 1 | +5 | −4.0 |
| 1038 | 0 | 1 | 0 | 0 | 0 | 0 | 0 | 0 | 1 | 1 | 1 | 0 | +6 | −4.8 |
| 1039 | 0 | 1 | 0 | 0 | 0 | 0 | 0 | 0 | 1 | 1 | 1 | 1 | +7 | −5.6 |
| 1040 | 0 | 1 | 0 | 0 | 0 | 0 | 0 | 1 | 0 | 0 | 0 | 0 | +8 | −6.4 |
| 1041 | 0 | 1 | 0 | 0 | 0 | 0 | 0 | 1 | 0 | 0 | 0 | 1 | +9 | −7.2 |
| 1042 | 0 | 1 | 0 | 0 | 0 | 0 | 0 | 1 | 0 | 0 | 1 | 0 | +10 | |
| ↓ | | | | | | | | | | | | | | |
| 1279 | 0 | 1 | 0 | 0 | 1 | 1 | 1 | 1 | 1 | 1 | 1 | 1 | +255 | −204 |
| 1280 | 0 | 1 | 0 | 1 | 0 | 0 | 0 | 0 | 0 | 0 | 0 | 0 | +256 | |

The counter 20 is set to the binary equivalent of decimal number 1032. It should be noted that a binary zero appears in the fourth, fifth, sixth and seventh bits of the counter. After one cycle of A and B pulses, any remainder in the counter between decimal numbers 1024 and 1039 will also contain binary zeros in the fourth, fifth, sixth and seventh bits. The decimal number 1024 remaining in the counter indicates that eight more data pulses occurred during a B pulse than occurred during an A pulse, and that the wheel-axle assembly is spinning or accelerating. If the binary equivalent of the decimal number 1039 appears as a remainder in the counter 20 after one cycle of A and B pulses have been counted, this indicates that seven more data pulses occurred during the time of the A pulse than the time of the B pulse, and that the wheel-axle assembly is sliding or decelerating. The binary equivalent of the decimal of 1024 indicates a speed change of approximately 6.4 mph/sec., while the binary equivalent of the decimal number 1039 indicates a speed change of approximately 5.6 mph/sec. Since it is theoretically possible that the vehicle may be accelerating or decelerating at a rate of up to 7 mph/sec. during normal operations, no action is taken by the present system within these limits.

However, if the remainder in the counter 20 after one cycle of A and B pulses have been counted is greater than the decimal number 1,039, or less than the decimal number 1,024, a binary one will appear in at least one of the fourth, fifth, sixth or seventh bits. These remainders correspond respectively to a deceleration of at least 6.4 mph/sec. and an acceleration of at least 7.2 mph/sec., and are indicative of a wheel-axle slide or spin respectively. When a binary one appears in any of the selected bits, corrective action is taken.

Since only the fourth, fifth, sixth and seventh bits in the binary counter 20 are relevant to the present system, only these bits are transferred from the counter 20 to the hold register 30 after each A and B pulse cycle. The complement of the four selected bits are then transferred by a timing pulse to a Nand gate 32 through line 33. If any of the inputs to the Nand gate 32 is a binary zero (indicating that the fourth, fifth, sixth or seventh bit contained a binary one) the output from the Nand gate 32 will be a binary one, indicating that corrective action should be taken. If all the inputs to the Nand gate 32 are binary ones, indicating that the selected bits in the counter 30 all contained binary zeros, the output from the Nand gate will be a zero.

The output from the Nand gate 32 is connected through a buffer amplifier 34 to a brake relay actuator 36. An output from the Nand gate of a binary one will cause actuation of the selected brake relay which actuates the brake cylinder blow-down valve. The brakes will thus be released, and cannot be reactivated until the output from the Nand gate 32 returns to a binary zero, or an emergency braking override system (not shown) is actuated. The relays and actuators necessary for the braking system are well known in the art, and do not form a portion of the present invention.

It is necessary to detect both wheel-axle slide and spin to effect proper control. When the braking force is removed from a sliding wheel, the wheel must then accelerate up to a rotational velocity corresponding to the train speed. This period of acceleration must be detected in order to hold off the brake force until the wheel velocity coincides with the train velocity. A delay may be built into the brake relay actuator 36 in order to hold the blow-down valve open during the time that it takes the wheel or axle to accelerate from a velocity which is less than that of the train to a velocity which is equal to that of the train.

It should be noted in Table I that binary ones will appear in the fourth, fifth, sixth and seventh bits for any binary number between the decimal numbers 776 and 1023, and also between decimal numbers 1040 and 1279. Decimal number 776 corresponds to a speed change of approximately 196 mph/sec., and decimal number 1279 corresponds to a speed change of approximately 204 mph/sec. These are the upper and lower limits of the present system with the binary equivalent of decimal number 1032 being preset in the counter 18. However, the limits are felt to be quite adequate for acceleration and deceleration values of present day vehicles.

In order to insure that the counter 20 and hold register 30 operate in unison with the data pulses passing through transmission gate 18 in response to the A and B pulses 26 and the up and down pulses 28, a timing circuit 38 is connected to the pulse generator 22 by means of a signal line 40. Only the B pulses produced in pulse generator 22 are fed to the timing circuit 38, and the timing circuit generates in the proper time sequence three timing pulses identified as reset, transfer and preset. FIG. 2 shows the timing cycle in graphic form. A one shot multivibrator in the timing circuit 38 triggers on the trailing edge of a received B pulse through signal line 40, and generates a reset pulse which is fed to the hold register 30 through signal line 42. The reset pulse clears the hold register of any previous information contained therein. On the trailing edge of the reset pulse, a transfer pulse is generated in timing circuit 38 and fed to the hold register 30 through a signal line 44. The purpose of the transfer pulse is to transfer the data contained in binary counter 20 after one A and B counting cycle into the temporary storage within the hold register 30. The trailing edge of the transfer pulse triggers within timing circuit 38 a preset pulse which is fed from timing circuit 38 to binary counter 20 through a signal line 46. The purpose of the preset pulse is to set the binary counter 20 to the binary equivalent of decimal number 1032 in order to prepare a counter for the next counting sequence of A and B pulses.

The complete timing cycle for the present invention is shown in FIG. 2. At a time indicated as the start of the cycle, the binary counter 20 is already set to the binary equivalent of decimal number 1032. An A pulse 26 is fed from pulse generator 26 to transmission gate 18 and the data pulses generated by the magnetic sensor 12 are passed through the transmission gate 18 into binary counter 20. At the same time, an up pulse 28 has been fed to the binary counter 20 to inform the counter 20 that the data pulses received during this time period are to be counted up within counter 20. The count up or A phase time lasts for 125 ms, assuming a clock 24 with a frequency of 4 Hz.

After the A count up phase, the system is quiescent for a time of 125 ms between the A and B timing pulses 26. During this time, the transmission gate 18 is closed and no data pulses are passed to the binary counter 20.

During the count down phase a B pulse 26 is fed to the transmission gate 18 and data pulses 14 pass therethrough to binary counter 20. At the same time, a down pulse 28 is being received by the binary counter 20 which indicates that the data pulses received during this time should be counted down. This phase also lasts for 125 ms.

At the end of the count down phase, the binary counter, having counted up and down for equivalent time periods, has stored therein binary information regarding the change in velocity of the wheel-axle combination of the vehicle during the preceding time period. At this time, a reset pulse is generated in timing circuit 38 to clear the hold register 30. Immediately thereafter, a transfer pulse is generated in timing circuit 38 which causes the transfer of the binary information in counter 20 to the hold register 30. The binary counter 20 is then preset to the binary equivalent of decimal number 1032 to prepare for the next timing cycle. The reset, transfer and preset pulses each take approximately 1.5 ms. The system is then quiescent for a time of approximately 121.5 ms when the cycle begins again.

An additional feature of the present system is a loss of signal detection circuit which indicates the loss of the wheel frequency signal from the sensor 12, or another malfunction in a system. The data pulses 14 after passing through amplifier 16 are fed on a signal line 46 to a loss of signal gate 48. Also fed to gate 48 on a signal line 50 is a signal which identifies the fact that the vehicle is in motion. The signal on line 50 may be a DC level which is of one polarity or magnitude when the vehicle is in motion, and of another polarity or magnitude when the train is not in motion. The gate 48 requires the presence of both inputs and if the signal indicating vehicle motion is present without the data pulses, a signal is fed to a display 52 which may take the form of a light which is turned on in the vehicle control panel. When both a train in motion signal and the data pulses are received at gate 48, no display light is turned on. Instead of a display light 52, this signal may be fed to other circuitry to take corrective action in response thereto.

The system as presently constructed uses primarily integrated circuits, although any type of circuitry known to those skilled in the art may also be used. For example, the hold register may consist of D-type flip flops and the binary counter may consist of up/down counters, both components being cos/mos series manufactured by RCA. Nand gate 32 may also be an integrated circuit of the same RCA type. The timing circuits 38 may be an RCA hex inverter integrated circuit.

Although the present invention has been described in terms of a train in which the brake pressure is relieved if a wheel or axle is accelerating or decelerating above or below a predetermined level, thereby indicating a spinning or sliding wheel, the inventive concepts may be applied to any vehicle in which it is desired to know the acceleration or deceleration of a wheel or axle. The inventive concepts including the presetting of the counter are equally applicable to any rotating, reciprocating or moving device in which information indicative of velocity, either rotational or transverse, is available. Other applications of the present invention will be apparent to those skilled in the art.

I claim:

1. Apparatus for determining a slide or spin condition of a wheel in a moving vehicle comprising
   means for generating a series of data pulses having a rate proportional to the rotational velocity of said wheel,
   a binary counter,
   means for setting into said counter the binary number equivalent to the decimal number 1032,
   means for directing said series of data pulses into said counter during first and second time periods, said counter adding the number of said data pulses received during said first time period and subtracting the number of data pulses received during said second time period, the counter containing therein a remainder binary count after said first and second time periods which is indicative of the rate of change of rotational velocity of said wheel during said time periods,
   means for sampling the binary state of the fourth, fifth, sixth and seventh bits of the remainder count within said counter,
   and means for generating an output signal when any of the said bits is a binary one.

2. Apparatus as in claim 1 in which said wheel is mounted on a vehicle which includes brake means for said wheel,
   said apparatus further including means responsive to said output signal for causing the release of said brake means.

3. Apparatus as in claim 1 in which said sampling means includes a storage register connected with said counter,
   means for transferring to said storage register the binary data contained in the fourth, fifth, sixth and seventh bits of said counter,
   and a Nand gate receiving from said storage register as inputs thereto the complement of the binary data contained in said storage register, said Nand gate producing said output signal when any of the inputs thereto is a binary zero.

4. Apparatus as in claim 1 in which said wheel is mounted on a vehicle,
   means for producing a motion signal when said vehicle is moving,
   a switching circuit,
   means for connecting said motion signal to said switching circuit as an input thereto,
   means for connecting said series of data pulses to said switching circuit as an input thereto,
   and means including said switching means for producing a warning signal indicative of a malfunction in said apparatus upon noncoincidence of said motion signal and said data pulses in said switching circuit.

5. A method for determining a slide or spin condition of a wheel in a moving vehicle comprising
   generating a series of data pulses having a rate proportional to the rotational velocity of said wheel,
   setting into a binary counter a preselected integral binary number other than zero,
   directing said series of data pulses to said counter during first and second time periods, said data pulses being added in said counter during said first time period and being subtracted in said counter during said second time period, said counter containing a remainder binary count after said first and second time periods,
   sampling the binary state of selected bits of the remainder count in said counter,
   and generating an output signal when the binary state of said selected bits in said remainder count is different from the binary state of the same bits in said preselected binary number.

6. The method of claim 5 in which said step of setting a binary number into said counter includes the step of setting into said counter the binary equivalent of the decimal number 1032, and in which the step of sampling the binary state of selected bits in the remainder count includes the step of sampling the binary state of the fourth, fifth, sixth and seventh bits of said remainder count.

* * * * *